Patented Feb. 24, 1953

2,629,725

UNITED STATES PATENT OFFICE 2,629,725

METHOD OF PREPARING ORGANO-SILOXANES

James Franklin Hyde, Corning, N. Y., assignor to Dow Corning Corporation, Midland, Mich., a corporation of Michigan No Drawing. Application July 19, 1950, Serial No. 174,806

8 Claims. (Cl. 260—448.2)

This invention relates to methods of preparing organosiloxanes from halosilanes.

Heretofore, siloxanes have been prepared by the hydrolysis of halosilanes. This method suffers from a disadvantage in that hydrogen halides are a by-product. In some cases, particularly with phenyl substituted silanes, the acid caused cleavage of phenyl radicals from the silicon. This undesirable result is highly objectionable when it is desired to prepare high polymers containing 2 organic groups attached to each silicon, for example polymers containing phenylmethylsiloxanes. In the case of hydrolysis with water some phenyl groups are removed to produce monomethylsiloxane. This causes gelation of the polymers as the molecular weight increased, and such gels are often undesirable.

It is an object of this invention to provide a novel method for preparing siloxanes which eliminates cleavage of acid-sensitive groups. Another object is to provide a method of readily copolymerizing siloxanes which are normally difficult to condense, such as bistrifluorotolylsiloxane, with readily condensable siloxanes such as dimethylsiloxane.

In accordance with this invention an organosilane of the formula $R_nSiX_{4-n}$ where R is an alkyl, aryl hydrocarbon, or halogenated aryl hydrocarbon radical, X is a halogen, and n is 1 to 3, is reacted with a metallic oxide of the group lead oxide, calcium oxide, magnesium oxide, and zinc oxide, in the presence of a solvent of the group liquid saturated aliphatic nitriles, liquid aromatic nitriles, liquid saturated aliphatic nitro compounds and liquid aromatic nitro compounds. The halosilane and oxide are reacted in such amount that there is at least 1 equivalent of metal oxide per equivalent of halogen in the silane and the solvent is present in amount of at least 1 per cent by weight based on the halosilane.

The applicant has found that reaction between halosilanes and the above defined oxides takes place readily in the presence of nitriles and nitro compounds to produce siloxanes and metal halides. The reaction proceeds smoothly at temperatures from 30° C. up. Normally, the reaction is carried out at the reflux temperature of the mixture.

Whereas reaction between the halosilanes and the metal oxides takes place regardless of the relative proportions of each, in order to obtain halogen-free siloxanes it is essential that the amount of metal oxide present be at least equivalent to the amount of halogen in the silane. Thus, for example, 1 mol of $R_2SiX_2$ requires at least 1 mol of CaO, whereas 1 mol of $R_3SiX$ would require ½ mol of CaO. In general it is preferred that the amount of oxide employed be from 1 to 10 per cent in excess of the minimum amount. The course of the reaction is not influenced by large excesses of the oxide, but no advantage is obtained by employing such.

The silanes which are employed in this invention include any silane having 1 R group and at least 1 silicon bonded halogen atom in which R is any alkyl radical or any aryl hydrocarbon or halogenated aryl hydrocarbon radical such as phenyl, tolyl, chlorophenyl, trifluorotolyl, xylyl, zenyl, and bromoxenyl. In the silane, X is fluorine, chlorine, bromine, or iodine.

Any saturated aliphatic nitrile, aromatic nitrile, saturated aliphatic nitro compound and aromatic nitro compound which is a liquid will promote reaction between halosilanes and the herein defined metal oxides, and are included within the purview of this invention. In order that the reaction may proceed at a reasonable rate, it is preferred that at least 1 per cent by weight of the solvent based on the weight of the halosilane be present. It is believed that the solvents promote the reaction because of their polarity. Any amount of solvent above 1 per cent by weight may be employed without deleteriously affecting the reaction. However, in general there is no advantage in employing more than a twofold weight excess of the solvent.

Specific examples of operable solvents are acetonitrile, propionitrile, butyronitrile, valeronitrile, benzonitrile, cyclohexonitrile, capronitrile, nitromethane, nitroethane, nitropropane, nitrooctane, nitrobenzene, nitrotoluene, and nitrocyclohexane.

The present invention is applicable not only for the preparation of organo polymeric siloxanes, but also for the preparation of copolymers. Thus, for example, by reacting dimethyldichlorosilane with bistrifluoromethylphenyldichlorosilane, one obtains copolymers thereof. These copolymers are difficult to obtain by hydrolysis.

It is often desirable to employ a small amount of $CuCl_2$ or $HgCl_2$ in order to hasten the reaction. The amount of catalyst normally employed is about .1 g. to 2 g. per mol of halosilane, although the amount of catalyst is not critical.

The following examples are given by way of illustration only, and are not to be construed as limiting the reaction.

Example 1

.1 mol of bistrifluorotolyldichlorosilane

[(F$_3$CC$_6$H$_4$)$_2$SiCl$_2$]

was mixed with 20 ml. of acetonitrile and was heated to reflux as a mixture of .103 mol of PbO and .1 g. of CuCl$_2$ was added portion-wise. Refluxing was continued for three days. The reaction mixture was filtered and heated to 320° C. at 1 mm. After removal of the solvent a viscous nonvolatile residue composed of bistrifluorotolylsiloxane [(F$_3$CC$_6$H$_4$)$_2$SiO] was obtained.

Example 2

1 mol of PbO was covered with acetonitrile and 1 g. of CuCl$_2$ was added. The mixture was heated to reflux as a mixture of .44 mol of bistrifluorotolyldichlorosilane and .24 mol of dimethyldichlorosilane was dropped slowly onto the oxide. The chlorides were added over a period of two hours and the mixture was refluxed for four hours more. The mixture was filtered and the filtrate distilled at a temperature up to 262° C. at less than 1 mm. There was obtained as a distillate a mixture of cyclic siloxanes which were copolymers of bistrifluorotolylsiloxane and dimethylsiloxane.

Example 3

.412 mol of dimethyldichlorosilane was refluxed with .415 mol of PbO and 32.9 g. of acetonitrile and .14 g. of CuCl$_2$ for three days. The solids were filtered and the solvent was evaporated. There was obtained dimethylsiloxane boiling range 80° C. to 127° C. at 1 mm. and a residue of nonvolatile dimethylsiloxane polymers.

Example 4

.373 mol of PbO was reacted with .694 mol of trimethylchlorosilane at reflux temperature in the presence of 47 g. of acetonitrile and .1 g. of HgCl$_2$ for seven days. The reaction mixture was filtered and distilled to obtain hexamethyldisiloxane, boiling point 98° C. at 740 mm.

Example 5

.357 mol of PbO and .351 mol of diphenyldichlorosilane were reacted in the presence of 49.33 g. of acetonitrile and .15 g. of CuCl$_2$ at reflux temperature for two days. Diphenylsiloxane was obtained.

Example 6

.243 mol of PbO and .468 mol of phenyldimethylchlorosilane was reacted in the presence of 33 g. of acetonitrile and .15 g. of CuCl$_2$ at reflux temperature for one day. Upon distillation, diphenyltetramethyldisiloxane, boiling point 112° C. to 113° C. at .5 mm. was obtained.

Example 7

A mixture of .655 mol of dimethyldichlorosilane and .334 mol of diphenyldichlorosilane was reacted with .99 mol of PbO in the presence of 77.5 g. of acetonitrile and .1 g. of HgCl$_2$ at reflux temperature for six days. A sticky liquid copolymer of dimethylsiloxane and diphenylsiloxane was obtained.

Example 8

A mixture of .33 mol of phenyldimethylchlorosilane and .164 mol of phenylmethyldichlorosilane was reacted with .371 mol of PbO in the presence of 58.6 g. of acetonitrile and .1 g. of HgCl$_2$ at reflux temperature for six days. A liquid copolymer of phenylmethylsiloxane and phenyldimethylsiloxane was obtained.

Example 9

.292 mol of dimethyldichlorosilane was reacted with .334 mol of CaO in the presence of 33 g. of acetonitrile and .18 g. of HgCl$_2$ at reflux temperature for one day. Upon distillation of the solvent a solid benzene-soluble siloxane was obtained. The siloxane contained no chlorine.

Example 10

.495 mol of phenylmethyldichlorosilane was reacted with .76 mol of MgO in the presence of 141 g. of acetonitrile and .1 g. of HgCl$_2$ at reflux temperature for six days. There was obtained a neutral nondistillable phenylmethylsiloxane.

Example 11

.46 mol of phenylmethyldichlorosilane was reacted with .508 mol of ZnO in the presence of 180 g. of acetonitrile and .1 g. of HgCl$_2$ at reflux temperature for one day. There was obtained a viscous liquid phenylmethylsiloxane.

Example 12

.351 mol of phenylmethyldichlorosilane was reacted with .435 mol of PbO in the presence of 42.3 g. of acetonitrile at reflux temperature for three days. Phenylmethylpolysiloxane was obtained.

Example 13

When a mixture of .5 mol of dimethyldichlorosilane and .5 mol of methyltrichlorosilane is reacted with .126 mol of PbO in the presence of 25 g. of acetonitrile at reflux temperature for two days a copolymer of monomethylsiloxane and dimethylsiloxane is obtained.

Example 14

Dimethylsiloxane is obtained when 1 mol of dimethyldichlorosilane is reacted at 30° C. with 1.1 mols of PbO in the presence of 25 g. of any of the following solvents: propionitrile, valeronitrile, benzonitrile, nitromethane, nitrobenzene, and nitropropane.

That which is claimed is:

1. A method of preparing organosiloxanes which comprises reacting a silane of the formula R$_n$SiX$_{4-n}$ where R is selected from the group consisting of alkyl, aryl hydrocarbon, and halogenated aryl hydrocarbon radicals, X is a halogen, and $n$ has a value from 1 to 3, with a metallic oxide selected from the group consisting of lead oxide, calcium oxide, magnesium oxide, and zinc oxide in amount such that there is at least one equivalent of metal oxide per equivalent of silicon bonded halogen in the silane, in the presence of a solvent selected from the group consisting of liquid saturated aliphatic nitriles, liquid aromatic nitriles, liquid saturated aliphatic nitro compounds, and liquid aromatic nitro compounds, said solvent being present in amount of at least 1 per cent by weight based on the weight of the silane and in which solvents the nitrile and the nitro group are the only functional groups present.

2. The method in accordance with claim 1 wherein the solvent is acetonitrile.

3. The method in accordance with claim 1 wherein the solvent is acetonitrile and the silane is phenylmethyldichlorosilane.

4. The method in accordance with claim 1 wherein the solvent is acetonitrile and the silane is bistrifluorotolyldichlorosilane.

5. The method in accordance with claim 1 wherein the solvent is acetonitrile and the silane is dimethyldichlorosilane.

6. The method in accordance with claim 1 wherein the solvent is acetonitrile and the silane is diphenyldichlorosilane.

7. The method in accordance with claim 1 wherein the solvent is acetonitrile and the silane is phenyldimethylchlorosilane.

8. A method of preparing organosiloxanes which comprises reacting a silane of the formula $R_nSiX_{4-n}$ where R is selected from the group consisting of alkyl, aryl hydrocarbon, and halogenated aryl hydrocarbon radicals, X is a halogen, and $n$ has a value from 1 to 3, with a metallic oxide selected from the group consisting of lead oxide, calcium oxide, magnesium oxide, and zinc oxide in amount such that there is at least one equivalent of metal oxide per equivalent of silicon bonded halogen in the silane, in the presence of a solvent selected from the group consisting of liquid saturated aliphatic nitriles, liquid aromatic nitriles, liquid saturated aliphatic nitro compounds, and liquid aromatic nitro compounds, said solvent being present in amount of at least 1 per cent by weight based on the weight of the silane, and in the presence of a catalyst selected from the group consisting of $CuCl_2$ and $HgCl_2$ in amount of about .1 g. of catalyst per mol of silane and in which solvents the nitrile and the nitro group are the only functional groups present.

JAMES FRANKLIN HYDE.

REFERENCES CITED

The following references are of record in the file of this patent:

FOREIGN PATENTS

| Number | Country | Date |
| --- | --- | --- |
| 606,301 | Great Britain | Aug. 11, 1948 |